United States Patent [19]
Okuyama et al.

[11] Patent Number: 5,630,008
[45] Date of Patent: May 13, 1997

[54] CONTROL CIRCUIT FOR DRIVING MOTOR WITH REDUCED POWER CONSUMPTION AND DISK UNIT HAVING THE CONTROL CIRCUIT

[75] Inventors: Yoshihiro Okuyama; Koichi Seno, both of Tendou, Japan

[73] Assignee: Mitsumi Electric Co., Ltd., Japan

[21] Appl. No.: 365,487

[22] Filed: Dec. 28, 1994

[30] Foreign Application Priority Data

Dec. 28, 1993 [JP] Japan .................. 5-337320
Dec. 28, 1993 [JP] Japan .................. 5-337321

[51] Int. Cl.⁶ ........................................... H02P 7/00
[52] U.S. Cl. ........................... 388/804; 318/254
[58] Field of Search .................... 388/804, 805, 388/811, 812, 819, 820, 903, 909; 363/40, 41, 26; 360/73.01, 73.03, 73.08, 73.09; 318/599, 254, 439, 138

[56] References Cited

U.S. PATENT DOCUMENTS

| | | | |
|---|---|---|---|
| 4,050,006 | 9/1977 | Stich | 363/98 |
| 4,123,692 | 10/1978 | Gilmore et al. | 388/804 |
| 4,628,314 | 12/1986 | Morinaga et al. | 388/804 X |
| 5,218,704 | 6/1993 | Watts, Jr. et al. | 364/707 X |
| 5,396,635 | 3/1995 | Fung | 395/800 |
| 5,402,200 | 3/1995 | Shrinkle et al. | 360/69 |
| 5,481,178 | 1/1996 | Wilcox et al. | 323/287 |

*Primary Examiner*—Jonathan Wysocki
*Attorney, Agent, or Firm*—Andrus, Sceales, Starke & Sawall

[57] ABSTRACT

A control circuit adapted to control a motor includes a first circuit part for generating an excitation current to be supplied to the motor and having a predetermined period that is dependent on a predetermined rotation period of the motor, and a second circuit part for superimposing on the excitation current pulses having a period that is small compared to the predetermined period of the excitation current.

14 Claims, 7 Drawing Sheets

CONTROL CIRCUIT FOR DRIVING MOTOR WITH REDUCED POWER CONSUMPTION AND DISK UNIT HAVING THE CONTROL CIRCUIT

BACKGROUND OF THE INVENTION

The present invention generally relates to control circuits and disk units, and more particularly to a control circuit for controlling a disk unit and to a disk unit having such a control circuit.

Generally, a floppy disk drive has a control integrated circuit (IC) which receives signals from a host computer via an interface. This control IC controls operations of a spindle motor driving IC, a stepping motor driving IC, a recording and reproducing IC and the like depending on the states of the signals received from the host computer.

Figure 1:
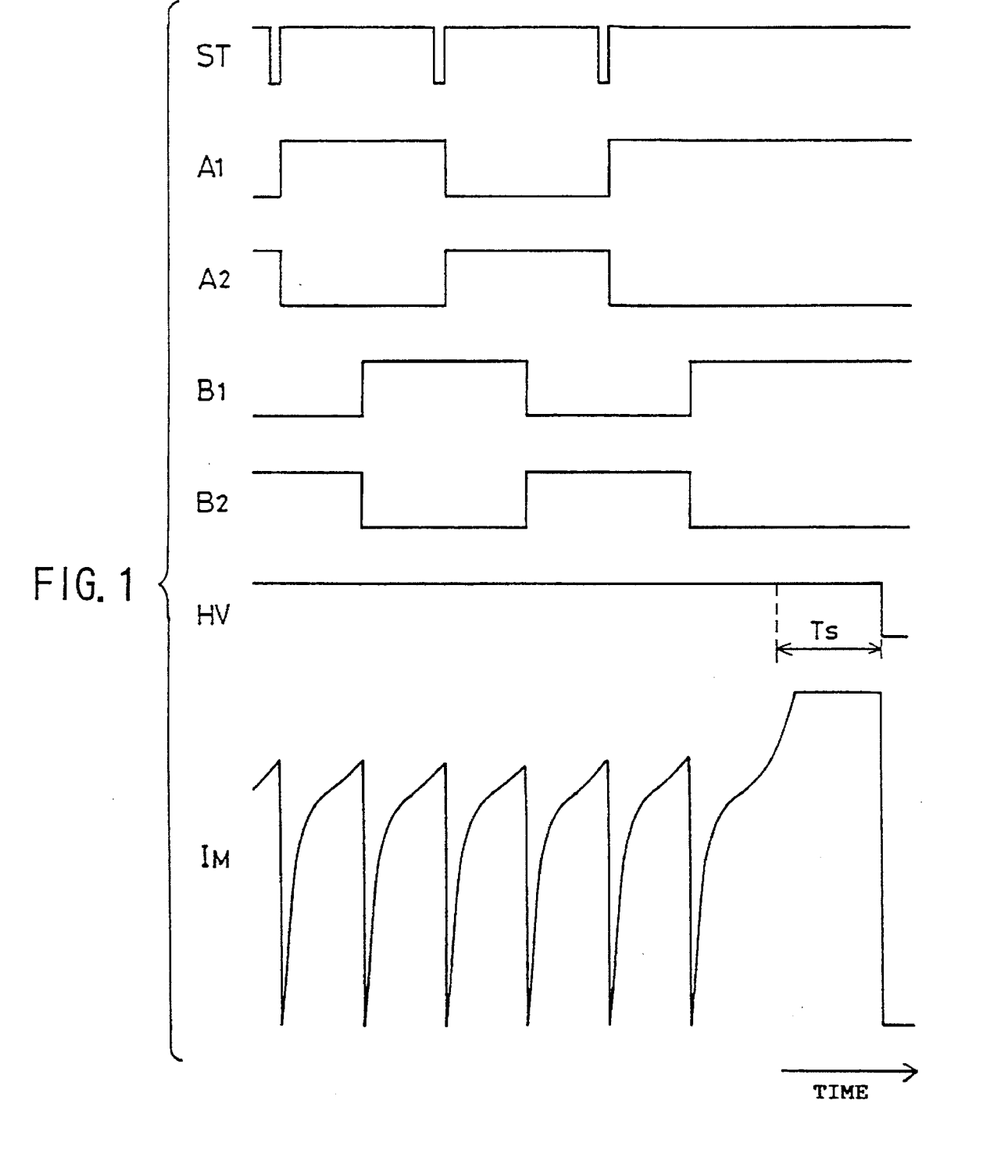
FIG. 1 is a timing chart for explaining the operation of a conceivable floppy disk drive.

FIG. 1 is a timing chart for explaining the operation of a conceivable floppy disk drive.

A step signal ST shown in FIG. 1 is input from the host computer to the control IC. This step signal ST is used to drive a stepping motor. When this step signal ST is periodically input to the control IC, the control IC generates phase-A excitation pulses $A_1$ which are inverted in synchronism with the rising edges of the step signal ST, and phase-B excitation pulses $B_1$ which have a phase that lags the phase of the phase-A excitation pulses $A_1$ by 90°.

The phase-A excitation pulses $A_1$ and the phase-B excitation pulses $B_1$ are input to the stepping motor driving IC and output via an output circuit. In addition, the phase-A excitation pulses $A_1$ and the phase-B excitation pulses $B_1$ are respectively inverted into inverted phase-A excitation pulses $A_2$ and inverted phase-B excitation pulses $B_2$ and output via the output circuit.

The phase-A excitation pulses $A_1$ and the inverted phase-A excitation pulses $A_2$ are applied across both ends of a first coil of the stepping motor to drive the same, while the B-phase excitation pulses $B_1$ and the inverted phase-B excitation pulses $B_2$ are applied across both ends of a second coil of the stepping motor to drive the same. As a result, the stepping motor is rotationally driven by excitation currents that flow to through the coils at predetermined timings.

When the stepping motor is driven, a head carriage mechanism having a recording and reproducing head on a tip end thereof is moved in a radial direction of a floppy disk, so as to carry out a seek operation in which a predetermined recording or reproducing position on the floppy disk is sought. A current $I_M$ consumed by the stepping motor during this seek operation has a waveform shown in FIG. 1. This current $I_M$ has an approximate rectangular waveform that periodically increases at ½ the period of the step signal ST.

The input of the step signal ST from the host computer to the control IC is stopped when stopping the seek operation. In this case, both the phase-A excitation pulses $A_1$ and the phase-B excitation pulses $B_1$ maintain a high level (that is, both the inverted phase-A excitation pulses A and the inverted phase-B excitation pulses $B_2$ maintain a low level), and the stepping motor stops rotating, thereby carrying out a settling operation in which the head carriage mechanism is fixed to a predetermined position. Even during a settling time $T_s$ in which this settling operation is carried out, a high voltage signal HV that is input to the control IC and controls the excitation (ON/OFF) of the coils of the stepping motor is maintained at the high level. For this reason, an excitation current continue to flow through the coils of the stepping motor in a predetermined direction. As a result, the current $I_M$ consumed by the stepping motor during this settling operation greatly increases to a predetermined value as shown in FIG. 1.

Therefore, according to the conceivable floppy disk drive described above, there is a problem in that the power consumption is large because the current $I_M$ consumed by the stepping motor during the seek operation of the head carriage mechanism periodically increases, and this current $I_M$ greatly increases to the predetermined value during the settling operation.

SUMMARY OF THE INVENTION

Accordingly, it is a general object of the present invention to provide a novel and useful disk unit control circuit and a disk unit, in which the problem described above is eliminated.

Another and more specific object of the present invention is to provide a control circuit adapted to control a motor, comprising first means for generating an excitation current to be supplied to the motor and having a predetermined period that is dependent on a predetermined rotation period of the motor, and second means, coupled to the first means, for superimposing on the excitation current, pulses having a period that is small compared to the predetermined period of the excitation current. According to the control circuit of the present invention, it is possible to effectively reduce the power consumption of the motor.

Still another object of the present invention is to provide a control circuit adapted to control a motor via a driving circuit having an output transistor, comprising first means for generating an excitation current to be supplied to the motor and having a predetermined period that is dependent on a predetermined rotation period of the motor, and second means, coupled to the first means, for increasing an ON-resistance of the output transistor at a period dependent on the predetermined period of the excitation current. According to the control circuit of the present invention, it is possible to effectively reduce the power consumption of the motor.

A further object of the present invention is to provide a disk unit comprising a motor, a driving circuit, coupled to the motor, driving the stepping motor in response to a control signal and an excitation current to be supplied to the motor, and a control circuit, coupled to the driving circuit, comprising first means for generating the excitation current having a predetermined period that is dependent on a predetermined rotation period of the motor, and second means, coupled to the first means, for superimposing on the excitation current, pulses having a period that is small compared to the predetermined period of the excitation current. According to the disk unit of the present invention, it is possible to effectively reduce the power consumption of the motor.

Another object of the present invention is to provide a disk unit comprising a motor, a driving circuit, coupled to the motor and including an output transistor, driving the stepping motor in response to a control signal and an excitation current to be supplied to the motor, and a control circuit, coupled to the driving circuit, comprising first means for generating the excitation current having a predetermined period that is dependent on a predetermined rotation period of the motor, and second means, coupled to the first means, for increasing an ON-resistance of the output transistor within the driving circuit at a period dependent on the predetermined period of the excitation current. According to the disk unit of the present invention, it is possible to effectively reduce the power consumption of the motor.

Still another object of the present invention is to provide a disk unit comprising heads for recording and reproducing signals on and from a disk, a control circuit including an oscillator circuit generating a reference clock signal that is supplied to various parts of the disk unit, and a recording and reproducing circuit including a voltage detection circuit monitoring a deviation of a power supply voltage and a circuit supplying driving currents to the heads, where the oscillator circuit and the voltage detection circuit form basic elements of the disk unit, the basic elements including the oscillator circuit and the voltage detection circuit stop operation in response to a sleep mode signal which instructs the disk unit to assume a sleep mode, and the disk unit in the sleep mode waits for an instruction and the control circuit controls the recording and reproducing circuit to stop supplying the driving current to the heads. According to the disk unit of the present invention, it is possible to minimize the power consumption of the disk unit in the sleep mode.

A further object of the present invention is to provide a disk unit of the immediately preceding type which further comprises a driving circuit, coupled to the motor, driving the stepping motor in response to a control signal and an excitation current to be supplied to the motor, and a control circuit, coupled to the driving circuit, comprising first means for generating the excitation current having a predetermined period that is dependent on a predetermined rotation period of the motor, and second means, coupled to the first means, for superimposing on the excitation current, pulses having a period that is small compared to the predetermined period of the excitation current. According to the disk unit of the present invention, it is possible to effectively reduce the power consumption of the motor.

Another object of the present invention is to provide the disk unit of the preceding type which further comprises a driving circuit, coupled to the motor and including an output transistor, driving the stepping motor in response to a control signal and an excitation current to be supplied to the motor, and a control circuit, coupled to the driving circuit, comprising first means for generating the excitation current having a predetermined period that is dependent on a predetermined rotation period of the motor, and second means, coupled to the first means, for increasing an ON-resistance of the output transistor within the driving circuit at a period dependent on the predetermined period of the excitation current. According to the disk unit of the present invention, it is possible to effectively reduce the power consumption of the motor.

Other objects and further features of the present invention will be apparent from the following detailed description when read in conjunction with the accompanying drawings.

DESCRIPTION OF THE PREFERRED EMBODIMENTS

First, a description will be given of a first embodiment of a disk unit according to the present invention, by referring to FIGS. 2 through 6. This embodiment of the disk unit employs a first embodiment of a control circuit according to the present invention, and in this embodiment, the present invention is applied to a floppy disk drive (FDD).

Figure 2:
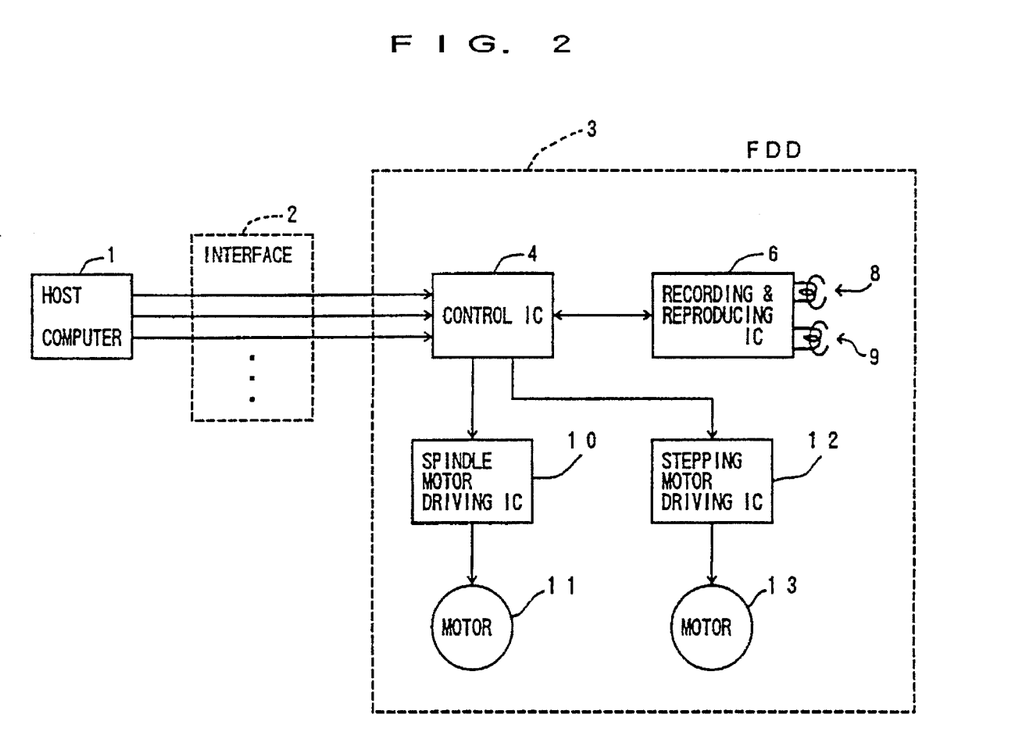
FIG. 2 is a system block diagram generally showing a first embodiment of a disk unit according to the present invention.

FIG. 2 generally shows the first embodiment of the disk unit. In FIG. 2, a host computer 1 is coupled to a FDD 3 via an interface 2. The FDD 3 includes a control ID4, a recording and reproducing IC 6, a recording head 8, a reproducing head 9, a spindle motor driving IC 10, a spindle motor 11, a stepping motor driving IC 12, and a stepping motor 13. Known circuits may be used for the recording and reproducing IC 6, the spindle motor driving IC 10 and the stepping motor driving IC 12. For example, a semiconductor chip CXA1362Q manufactured by Sony may be used for the recording and reproducing IC 6, a semiconductor chip LB1813M manufactured by Sanyo may be used for the spindle motor driving IC 10, and a semiconductor chip μPD16818GS manufactured by Nippon Electric Company (NEC) may be used for the stepping motor driving IC 12.

The host computer 1 is provided as an external control unit with respect to the FDD 3. For example, the host computer 1 is a general personal computer. Various kinds of control signals including signals for turning motors ON are output from the host computer 1 and input to the control IC 4 of the FDD 3 via the interface 2.

The control IC 4 controls the recording and reproducing operations of the recording and reproducing IC 6. The control IC 4 supplies a recording signal to the recording and reproducing IC 6, and the recording signal is recorded on a floppy disk (not shown) by the recording head 8. A recorded signal on the floppy disk is picked up by the reproducing head 9, reproduced by the recording and reproducing IC 8, and is supplied to the control IC 4.

In addition, the control IC 4 controls the operation of the spindle motor driving IC 10. The spindle motor driving IC 10 rotationally drives the spindle motor 11 depending on a signal received from the control IC 4. The floppy disk engages a spindle shaft via a known chuck mechanism (not shown), and the spindle motor 11 rotates the spindle shaft so as to rotate the floppy disk.

Furthermore, the control IC 4 controls the operation of the stepping motor driving IC 12. The stepping motor 13 drives a known head carriage mechanism (not shown) that carries the recording head 8 and the reproducing head 9 in a radial direction of the floppy disk. The stepping motor driving IC 12 rotationally drives the stepping motor 13 depending on a signal received from the control IC 4. The recording head 8 and the reproducing head 9 may have a one-piece construction that integrally has the recording head 8 and the reproducing head 9.

Figure 3:
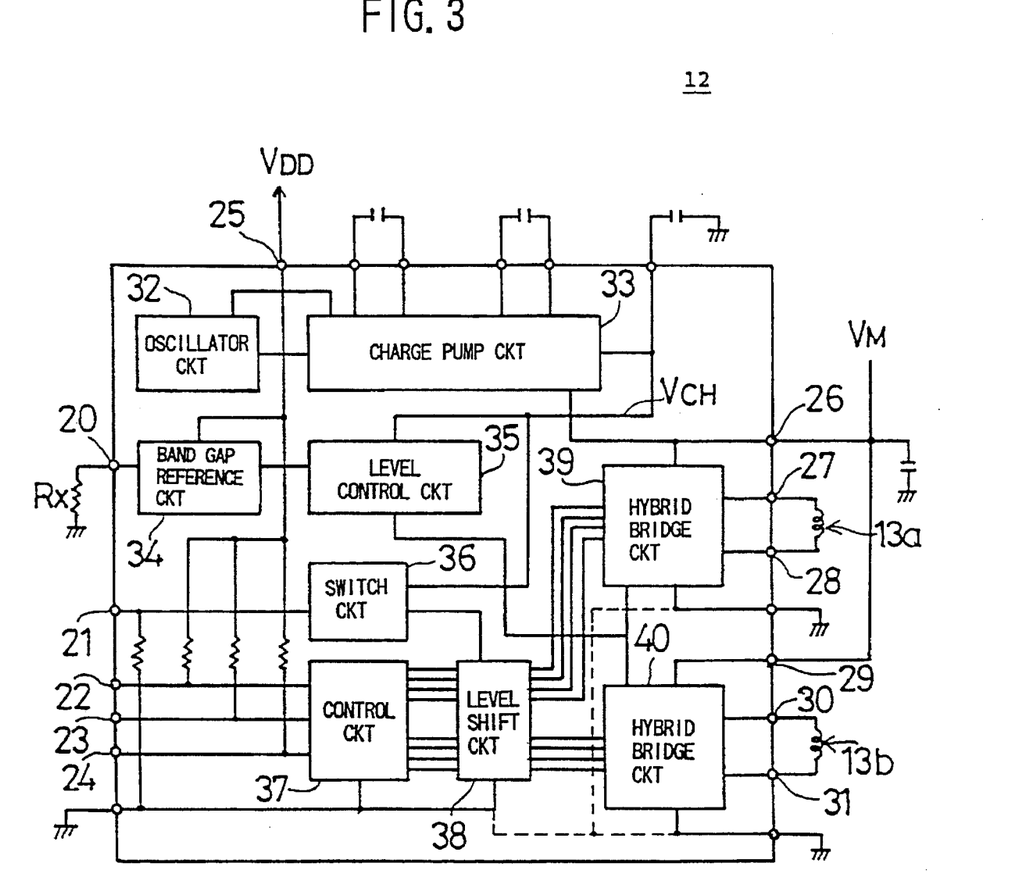
FIG. 3 is a system block diagram showing the construction of a stepping motor driving IC shown in FIG. 2.

FIG. 3 shows the construction of the stepping motor driving IC 12.

In FIG. 3, a power save signal PS from the control IC 4 is input to an input terminal 21, phase-Excitation pulses $A_1$ are input to an input terminal phase-B excitation pulses $B_1$ are input to an input terminal 23, and a high voltage signal HV is input to an input terminal 24. The power save signal PS puts the stepping motor driving IC 12 into a power save mode which saves the power consumed by the stepping motor driving IC 12. A D.C. power supply voltage $V_{DD}$ having a voltage of 3.3 V, for example, is supplied to a power terminal 25 from an external power supply circuit (not shown). A resistor $R_x$ is connected between a terminal 20 and the ground.

In the stepping motor driving IC 12, an oscillator circuit 32 generates a sinusoidal wave having a frequency of approximately 20 kHz, and this sinusoidal wave is supplied to a charge pump circuit 33. The charge pump circuit 33 generates a boosted D.C. voltage $V_{CH}$ based on the sinusoidal wave from the oscillator circuit 32.

The resistor $R_x$ is connected to a band gap reference circuit 34 via the terminal 20, and the band gap reference circuit 34 generates a reference voltage depending on the resistance of the resistor $R_x$. A level control circuit 35 controls the level of the D.C. voltage $V_{CH}$ generated from the charge pump circuit based on the reference voltage.

The power save signal PS is input to a switch circuit 36 via the input terminal 21, and the level of the D.C. voltage $V_{CH}$ generated from the charge pump circuit 33 is controlled by a control signal from the level control circuit 35 when the power save signal PS has a high level.

On the other hand, when the power save signal PS has a low level, the D.C. voltage $V_{CH}$ generated from the charge pump circuit 33 is not controlled by the control signal from the level control circuit 35, and the charge pump circuit 33 generates the D.C. voltage $V_{CH}$ having a normal boost level. This normal boost level is higher than the level to which the D.C. voltage $V_{CH}$ is controlled based on the resistor $R_x$.

A control circuit 37 receives the phase-A excitation pulses $A_1$, the phase-B excitation pulses $B_1$ and the high voltage signal HV vi. the respective input terminals 22, 23 and 24. The phase-A excitation pulses $A_1$, the phase-B excitation pulses $B_1$ and the high voltage signal HV are supplied to hybrid bridge circuits 39 and 40 provided on the output stage via a level shift circuit 38.

The hybrid bridge circuits 39 and 40 respectively have output transistors, and an ON-resistance of each output transistor is controlled in an inversely proportional manner with respect to the D.C. voltage $V_{CH}$ from the charge pump circuit 33.

Figure 4:
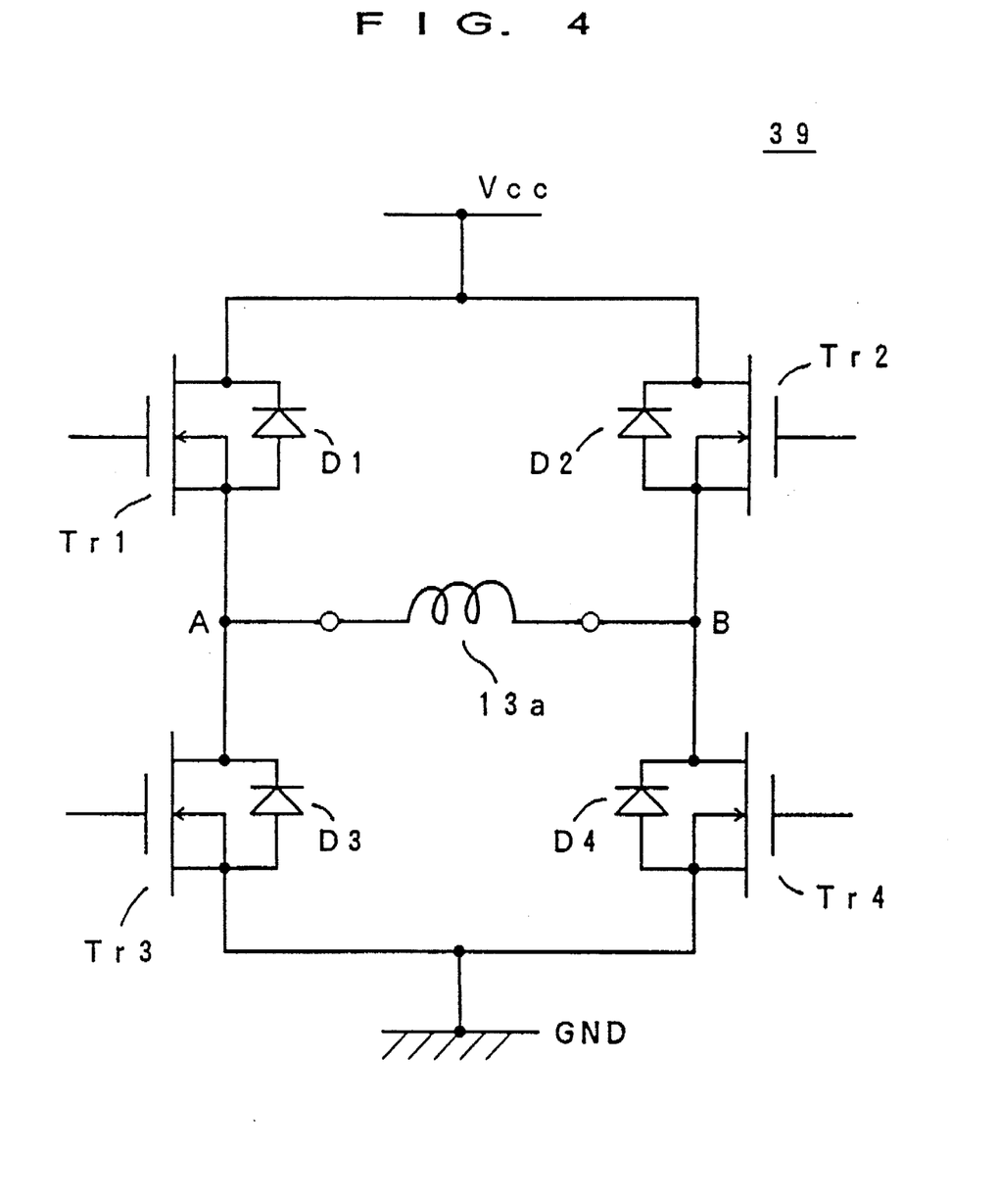
FIG. 4 is a circuit diagram showing a part of a hybrid bridge circuit.

FIG. 4 shows a part of the hybrid bridge circuit 39. This hybrid bridge circuit 39 includes four output transistors Tr1 through Tr4, and four diodes D1 through D4 which are connected as shown. The coil 13a of the stepping motor 13 is connected across nodes A and B.

The hybrid bridge circuit 40 may have the same construction as the hybrid bridge circuit 39 shown in FIG. 4.

The hybrid bridge circuit 39 generates the phase-A excitation pulses. Hence, the phase-A excitation pulses $A_1$ are obtained from an output terminal 27, and inverted phase-A excitation pulses $A_2$ are obtained from an output terminal 28. A coil 13a of the stepping motor 13 is connected between the output terminals 27 and 28.

The hybrid bridge circuit 40 generates the phase-B excitation pulses. Hence, the phase-B excitation pulses $B_1$ are obtained from an output terminal 30, and inverted phase-B excitation pulses $B_2$ are obtained from an output terminal 31. A coil 13b of the stepping motor 13 is connected between the output terminals 30 and 31.

Accordingly, both the coils 13a and 13b are excited, and the stepping motor 13 rotates at a predetermined period depending on the timings of the excitation pulses. In addition, the hybrid bridge circuits 39 and 40 do not output the excitation pulses when the high voltage signal HV has a low level, and the excitation is controlled by the high voltage signal HV.

Power terminals 26 and 29 are connected to an external power supply unit (not shown) for powering the motors. A power supply voltage $V_M$ from this external power supply unit is supplied to the hybrid bridge circuits 39 and 40 via the respective power terminals 26 and 29.

Figure 5:
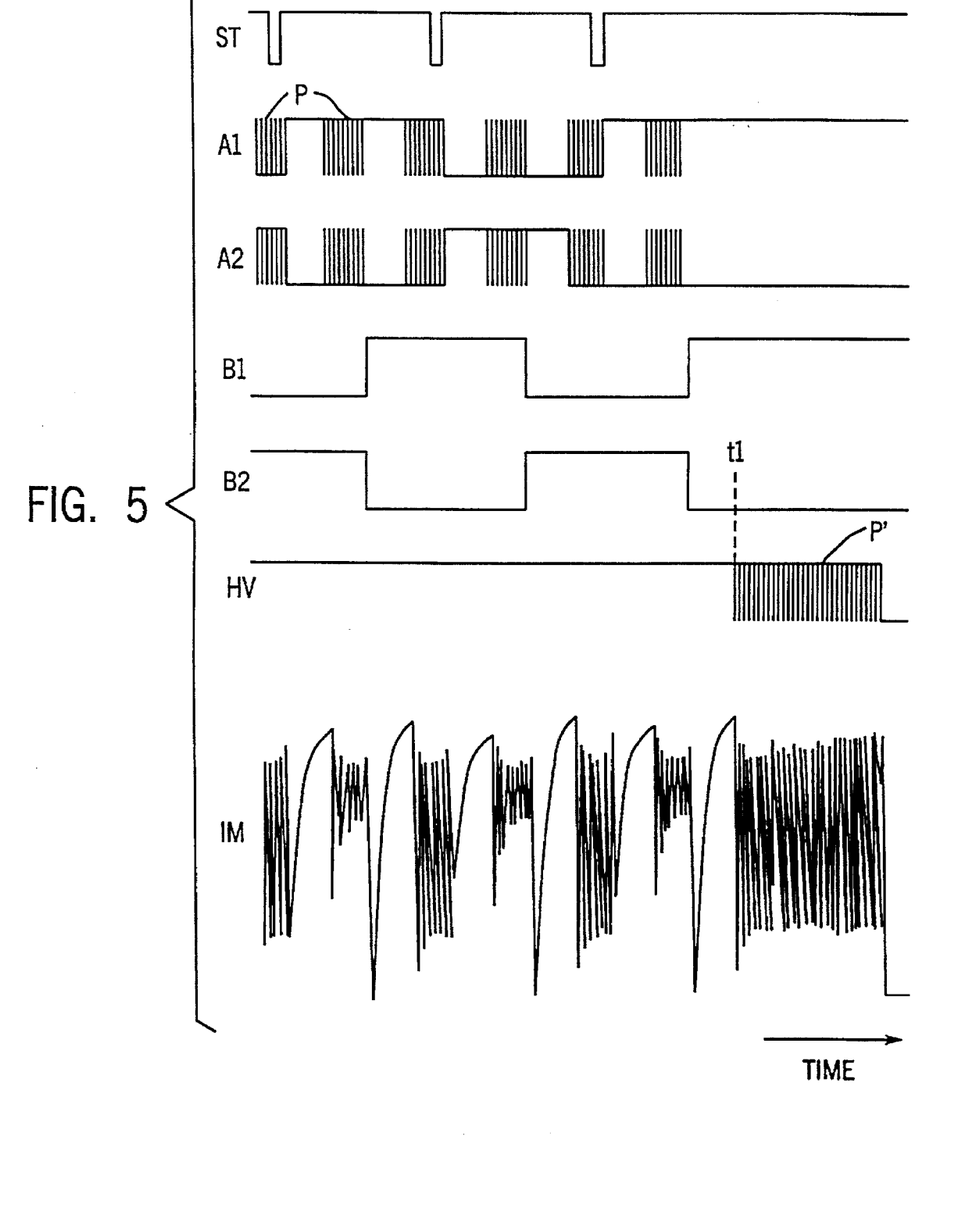
FIG. 5 is a timing chart for explaining an embodiment of the control operation of a control IC shown in FIG. 2.

FIG. 5 is a timing chart for explaining an embodiment of the control operation of the control IC 4 shown in FIG. 2. FIG. 5 shows a step signal ST from the host computer 1, the phase-A excitation pulses $A_1$ generated from the control IC 4, the inverted phase-A excitation pulses $A_2$ generated from the stepping motor driving IC 12, the phase-B excitation pulses $B_1$ generated from the control IC 4, the inverted phase-B excitation pulses $B_2$ generated from the stepping motor driving IC 12, the high voltage signal HV generated from the control IC 4, and a current (hereinafter referred to as an excitation current) $I_M$ consumed by the stepping motor 13 and is measured at a motor power line. The step signal ST is used to drive the stepping motor 13.

During a seek operation, when the step signal ST shown in FIG. 5 is periodically output from the host computer 1 to the control IC 4 of the FDD 3 via the interface 2, the control IC 4 generates the phase-A excitation pulses 1 which are inverted in synchronism with the rising edges of the step signal ST and the phase-B excitation pulses $B_1$ which have a phase that lags the phase of the phase-A excitation pulses $A_1$ by 90°. The phase-A excitation pulses $A_1$ and the phase-B excitation pulses $B_1$ are supplied to the stepping motor driving IC 12.

As shown in FIG. 5, pulses P having an extremely short period compared to the period of the step signal ST, that is, the period of the original excitation pulses, are superimposed on the phase-A excitation pulses $A_1$ for a predetermined time at ½ the period of the step signal ST. In other words, the pulses P are superimposed on the phase-A excitation pulses $A_1$ during a time before the phase-A excitation pulse $A_1$ is inverted and during a time before the phase-B excitation pulse $B_1$ is inverted.

The inverted phase-A excitation pulses $A_2$ ad the inverted phase-B excitation pulses $B_2$ respectively have waveforms that are inverted with respect to the phase-A excitation pulses $A_1$ and the phase-B excitation pulses $B_1$. Hence, the stepping motor 13 rotates at a predetermined period dependent on the timings of the excitation pulses. During the seek operation, the high voltage signal HV is maintained to a high level.

In FIG. 5, it is assumed for the sake of convenience that a settling operation starts from a time $t_1$. In this case, pulses P' having an extremely short period compared to the period of the step signal ST, that is, the period of the original excitation pulses, are superimposed on the high voltage signal HV as shown in FIG. 5. During the time when the pulses P' are superimposed on the high voltage signal HV, the excitation current $I_M$ fluctuates, that is, increases and decreases, at a high speed.

Consequently, the stepping motor 13 rotates at the predetermined rotation period, and the excitation current $I_M$ fluctuates at a high speed depending on the period of the pulses P and P'. As a result, the average value of the excitation current $I_M$ during the time when these pulses P and P' are superimposed decreases. Therefore, it is possible to reduce the current consumption of the stepping motor 13 when driving the head carriage mechanism by the stepping motor 13. In other words, it is possible to reduce the current consumption of the stepping motor 13 during the seek operation and during the settling operation.

According to the conceivable FDD described above in connection with FIG. 1, the power consumption during the seek operation was approximately 3.4 W. However, according to this embodiment if the present invention, it was possible to reduce the power consumption to approximately 2.2 W. In addition, the power consumption during the settling operation was approximately 4.0 W in the conceivable FDD, but the power consumption was reduced to approximately 1.91 W according to this embodiment. Hence, the this embodiment can reduce the power consumption to approximately ½ that of the conceivable FDD during the settling operation.

Figure 6:
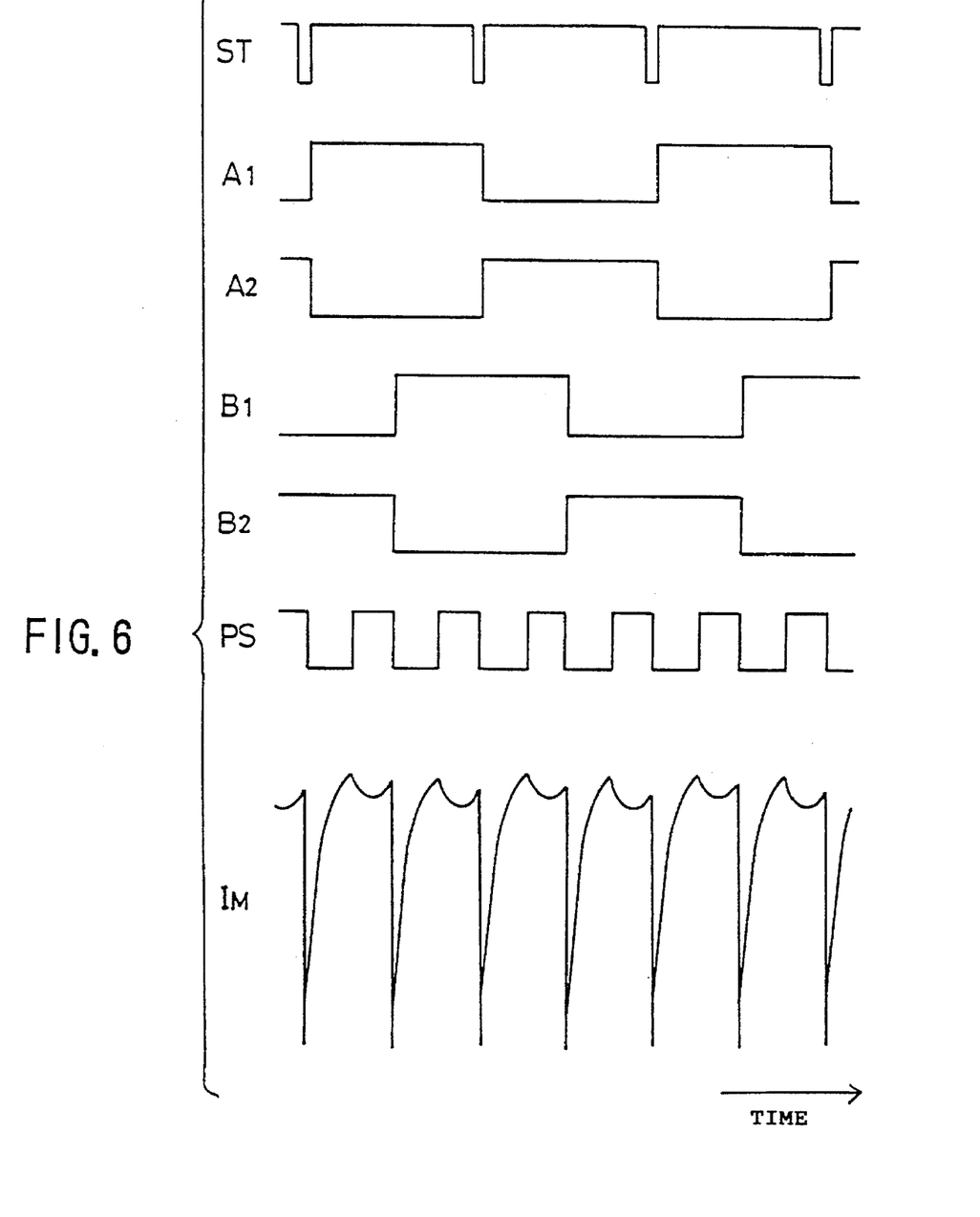
FIG. 6 is a timing chart for explaining another embodiment of the control operation of the control IC shown in FIG. 2.

FIG. 6 is a timing chart for explaining another embodiment of the control operation of the control IC 4 shown in FIG. 2. FIG. 6 shows a step signal ST from the host computer 1, the phase-A excitation pulses $A_1$ generated from the control IC 4, the inverted phase-A excitation pulses $A_2$ generated from the stepping motor driving IC 12, the phase-B excitation pulses $B_1$ generated from the control IC 4, the inverted phase-B excitation pulses $B_2$ generated from the stepping motor driving IC 12, a power save signal PS generated from the control IC 4, and the current (excitation current) $I_M$ consumed by the stepping motor 13 and is measured at a motor power line.

When the step signal ST shown in FIG. 8 from the host computer 1 is periodically input to the control IC 4, the control IC 4 generates the phase-A excitation pulses $A_1$ that is inverted in synchronism with the rising edges of the step signal ST and the phase-B excitation pulses $B_1$ that has a phase lagging the phase of the phase-A excitation pulses $A_1$ by 90°.

On the other hand, the inverted phase-A excitation pulses $A_2$ and the inverted phase-B excitation pulses $B_2$ shown in FIG. 8 respectively have waveforms that are inverted with respect to the waveforms of the phase-A excitation pulses $A_1$ and the phase-B excitation pulses $B_1$. Hence, the stepping motor 13 rotates at a predetermined period depending on the timings of the excitation pulses.

The power save signal PS shown in FIG. 8 assumes a low level at the same time as when the phase-A excitation pulses $A_1$ and the phase-B excitation pulses $B_1$ are inverted, and assumes a high level at a predetermined timing before the phase-A excitation pulses $A_1$ and the phase-B excitation pulses $B_1$ are inverted again.

During a high-level period of the power save signal PS amounting to 700 μsec, for example, the switch circuit 38 shown in FIG. 4 carries out a switching operation so that the level of the D.C. voltage $V_{CH}$ from the charge pump 33 is set to a value dependent on the resistance of the resistor $R_x$ based on the control signal from the level control circuit 35. In this embodiment, the resistor $R_x$ has a resistance of 39 kΩ, for example.

Accordingly, during the high-level period of the power save signal PS, the output D.C. voltage $V_{CH}$ of the charge pump circuit 33 is reduced and set lower than the normal value. As a result, the ON-resistance of the output transistor in each of the hybrid bridge circuits 39 and 40 becomes large, thereby decreasing the excitation currents that flow through the coils 13a and 13b.

Therefore, as shown in FIG. 6, the periodical increase of the current $I_M$ is suppressed during the high-level period of the power save signal PS, and the current $I_M$ consumed by the stepping motor 13 when driving the head carriage mechanism, that is, when carrying out the seek operation, is reduced.

According to the conceivable FDD described above, the power consumption during the seek operation was approximately 3.4 W, but the power consumption was reduced to approximately 2.28 W according to this embodiment.

In this embodiment, it is also possible to provide a circuit for generating the power save signal PS externally to a known control IC such as a semiconductor chip NCL016 manufactured by Rohm, so as to form the control IC 4.

Next, a description will be given of a second embodiment of a disk unit according to the present invention, by referring to FIG. 7. This embodiment of the disk unit employs a second embodiment of a control circuit according to the present invention, and in this embodiment, the present invention is also applied to a FDD.

Figure 7:
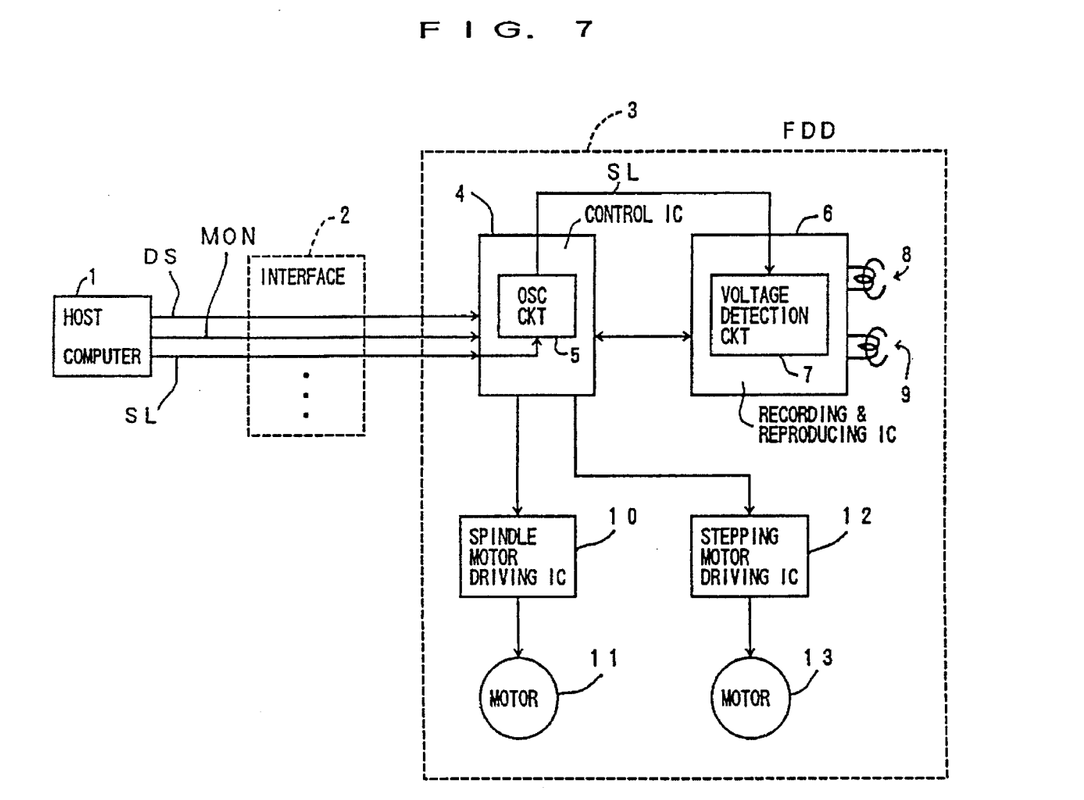
FIG. 7 is a system block diagram generally showing a second embodiment of the disk unit according to the present invention.

FIG. 7 generally shows the second embodiment of the disk unit. In FIG. 7, those parts which are the same as those corresponding parts in FIG. 2 are designated by the same reference numerals, and a description thereof will be omitted.

In FIG. 7, the control IC 4 includes an oscillator circuit 5 that generates a reference clock signal that is supplied to various parts of the FDD 3, and the recording and reproducing IC 8 includes a voltage detection circuit 7 that supervises a deviation of the power supply voltage. In order to prevent an erroneous operation of the FDD 3, the recording or reproducing operation of the FDD 3 is stopped when the voltage detection circuit 7 detects a fall of the power supply voltage below a predetermined tolerable value.

For example, when all of the signals from the host computer 1 including control signals such as a drive select signal DS and a motor ON signal MON have high levels, the control IC 4 is put into a standby state that waits for an instruction related to an operation. The drive select signal DS is used to select a particular FDD 3, and the motor ON signal MON is used to control the ON/OFF state of the spindle motor 11. Hence, the control IC 4 in the standby state stops the operations of the spindle motor driving IC 10, the stepping motor driving IC 12, the recording and reproducing IC 6 and the like to put them in the standby state. Accordingly, in this standby state, no driving current is supplied to the spindle motor 11 and the stepping motor 13, and no current is supplied to the recording head 8 and the reproducing head 9.

By putting the FDD 3 into the standby state depending on the states of the drive select signal DS and the motor ON signal MON received from the host computer 1, it is possible to reduce the power consumption of the FDD 3 to approximately 17 mW when the FDD 3 is not carrying out a recording or reproducing operation.

However, in the standby state, basic elements of the within the FDD 3, such as a counter, are still operative so that the FDD 3 can start operating immediately in response to a request or instruction. But because the oscillator circuit 5 within the control IC 4 and the voltage detection circuit 7 within the recording and reproducing IC 6 operate even in the standby state, it is impossible to further reduce the power consumption of the FDD 3 when the FDD 3 is not carrying out the recording or reproducing operation. Accordingly, this embodiment stops the operation of the oscillator circuit 5 and the operation of the voltage detection circuit 7 in a sleep mode.

In other words, the control IC 4 sets the operation mode of the FDD 3 to a sleep mode when a sleep mode signal SL from the host computer 1 has a low level and the other signals from the host computer 1, including the control signals such as the drive select signal DS and the motor ON signal MON have high levels.

In the sleep mode, the recording and reproducing IC 6 stops the recording or reproducing operation, the spindle motor driving IC 10 stops the operation of driving and controlling the spindle motor 11, and the stepping motor driving IC 12 stops the operation of driving and controlling the stepping motor 13, respectively under the control of the control IC 4. Hence, the power consumption of the FDD 3 is further reduced. In addition, the sleep mode signal SL is supplied to the oscillator circuit 5 within the control IC 4 to stop the operation of the oscillator circuit 5, and to the voltage detection circuit 7 within the recording and reproducing IC 6 to stop the operation of the voltage detection circuit 7.

Therefore, the operations of the basic elements within the FDD 3, including the oscillator circuit 5 and the voltage detection circuit 9, are stopped in the sleep mode, thereby stopping the operation of all of the circuits within the FDD 3. As a result, it is possible to further reduce the power consumption of the FDD 3 in the sleep mode as compared to the conceivable FDD in the standby state. According to the experiments conducted by the present inventors, it was possible to reduce the power consumption in the sleep mode to approximately 7 mW, that is, to reduce the power consumption in the sleep mode by approximately 59% as compared to the power consumption in the standby state of the conceivable FDD.

In the embodiments described heretofore, the present invention is applied to the FDD. However, the present invention can of course be applied to other disk units such as a hard disk unit.

In addition, it is of course possible to combine the first and second embodiments described above.

Further, the present invention is not limited to these embodiments, but various variations and modifications may be made without departing from the scope of the present invention.

What is claimed is:

1. A control circuit for driving a motor, comprising:

first means for generating an excitation current to be supplied to the motor and having a predetermined period that is dependent on a predetermined rotation period of the motor, said excitation current including first excitation pulses having a period and second excitation pulses having a period, said second excitation pulses having a phase which lags a phase of the first excitation pulses by 90°;

second means, coupled to said first means, for superimposing, on said first excitation pulses, pulses having a period that is small compared to said period of said first and second excitation pulses.

2. A control circuit for driving a motor via a driving circuit having an output transistor, comprising:

first means for generating an excitation current to be supplied to the motor and having a predetermined period that is dependent on a predetermined rotation period of the motor, said excitation current including first excitation pulses having a period and second excitation pulses having a period, said second excitation pulses having a phase which lags a phase of the first excitation pulses by 90°, said first and second pulses being formed by signal inversion; and second means, coupled to said first means, for increasing an ON-resistance of the output transistor in a period dependent on said period of said first and second excitation pulses by supplying a voltage to the driving circuit, said voltage assuming a high level simultaneously when the first excitation pulses and the second excitation pulses are inverted and assuming a low level at a predetermined time before the first excitation pulses and the second excitation pulses are subsequently again inverted.

3. A disk unit comprising:

a motor;

a driving circuit, coupled to said motor, for driving said motor in response to a control signal and an excitation current to be supplied to said motor; and a control circuit, coupled to said driving circuit, comprising:

first means for generating the excitation current having a predetermined period that is dependent on a predetermined rotation period of said motor, said excitation current including first excitation pulses having a period and second excitation pulses having a period, said second excitation pulses having a phase which lags a phase of the first excitation pulses by 90°; and second means, coupled to said first means, for superimposing, on said first excitation pulses, pulses having a period that is small compared to said period of said first and second excitation pulses.

4. The disk unit as claimed in claim 3, which further comprises:

heads for recording and reproducing signals on and from a disk, said motor providing a driving force for moving said heads relative to the disk.

5. A disk unit comprising:

a motor;

a driving circuit, coupled to said motor and including an output transistor, driving said motor in response to a control signal and an excitation current to be supplied to said motor; and a control circuit, coupled to said driving circuit, comprising:

first means for generating the excitation current having a predetermined period that is dependent on a predetermined rotation period of said motor, said excitation current including first excitation pulses having a period and second excitation pulses, having a period, said second excitation pulses having a phase which lags a phase of the first excitation pulses by 90°, said first and second pulses being formed by signal inversion; and second means, coupled to said first means, for increasing an ON-resistance of the output transistor within said driving circuit in a period dependent on said period of said first and second excitation pulses by supplying a voltage to the driving circuit, said voltage assuming a high level simultaneously when the first excitation pulses and the second excitation pulses are inverted and assuming a low level at a predetermined time before the first excitation pulses and the second excitation pulses are subsequently again inverted.

6. The disk unit as claimed in claim 5, which further comprises:

heads for recording and reproducing signals on and from a disk, said motor providing a driving force for moving said heads relative to the disk.

7. A disk unit comprising:

heads for recording and reproducing signals on and from a disk;

a control circuit including an oscillator circuit generating a reference clock signal that is supplied to at least one part of the disk unit; and a recording and reproducing circuit including a voltage detection circuit monitoring a deviation of a power supply voltage and a circuit supplying driving currents to said heads, said oscillator circuit and said voltage detection circuit stopping operation in response to a sleep mode signal which instructs the disk unit to assume a sleep mode, said disk unit in the sleep mode waiting for an instruction and said control circuit controlling said recording and reproducing circuit to stop supplying the driving current to said heads.

8. The disk unit as claimed in claim 7, which further comprises:

a driving circuit, coupled to said motor, driving said motor in response to a control signal and an excitation current to be supplied to said motor; and a control circuit, coupled to said driving circuit, comprising:

first means for generating the excitation current having a predetermined period that is dependent on a predetermined rotation period of said motor, said excitation current including first excitation pulses having a period and second excitation pulses having a period, said second excitation pulses having a phase which lags a phase of the first excitation pulses by 90°; and second means, coupled to said first means, for superimposing, on said first excitation pulses, pulses having a period that is small compared to said predetermined period of said first and second excitation pulses.

9. The disk unit as claimed in claim 7, which further comprises:

a driving circuit, coupled to said motor and including an output transistor, driving said motor in response to a control signal and an excitation current to be supplied to said motor; and a control circuit, coupled to said driving circuit, comprising:

first means for generating the excitation current having a predetermined period that is dependent on a predetermined rotation period of said motor, said excitation current including first excitation pulses having a period and second excitation pulses having a period, said second excitation pulses having a phase which lags a phase of the first excitation pulses by 90°, said first and second pulses being formed by signal inversion; and second means, coupled to said first means, for increasing an ON-resistance of the output transistor within said driving circuit in a period dependent on said predetermined period of said first and second excitation pulses by supplying a voltage to the driving circuit, said voltage assuming a high level simultaneously when the first excitation pulses and the second excitation pulses are inverted and assuming a low level at a predetermined time before the first excitation pulses and the second excitation pulses are subsequently again inverted.

10. The control circuit as claimed in claim 1, wherein said first and second excitation pulses are formed by signal inversion, and wherein said second means superimposes the pulses on said first excitation pulses during a predetermined time interval before the first excitation pulse is inverted and during a predetermined time interval before the second excitation pulse is inverted.

11. The control circuit as claimed in claim 1, which further comprises:

means for superimposing predetermined pulses on a high voltage signal for controlling excitation of coils of the motor when a settling operations starts, said predetermined pulses having a short period compared to the period of the excitation current.

12. The control circuit as claimed in claim 3, wherein said first and second excitation pulses are formed by signal inversion, and wherein said second means superimposes the pulses on said first excitation pulses during a predetermined time interval before the first excitation pulse is inverted and during a predetermined time interval before the second excitation pulse is inverted.

13. The disk unit as claimed in claim 8, wherein in said control circuit said first and second excitation pulses are formed by signal inversion, and wherein said second means superimposes the pulses on said first excitation pulses during a predetermined time interval before the first excitation pulse is inverted and during a predetermined time interval before the second excitation pulse is inverted.

14. The disk unit as claimed in claim 8, which further comprises:

means for superimposing predetermined pulses on a high voltage signal for controlling excitation of coils of the motor when a settling operation starts, said predetermined pulses having a short period compared to the period of the excitation current.

* * * * *